No. 646,846. Patented Apr. 3, 1900.
F. M. LEPORE.
SALT AND PEPPER HOLDER.
(Application filed Dec. 16, 1899.)
(No Model.)
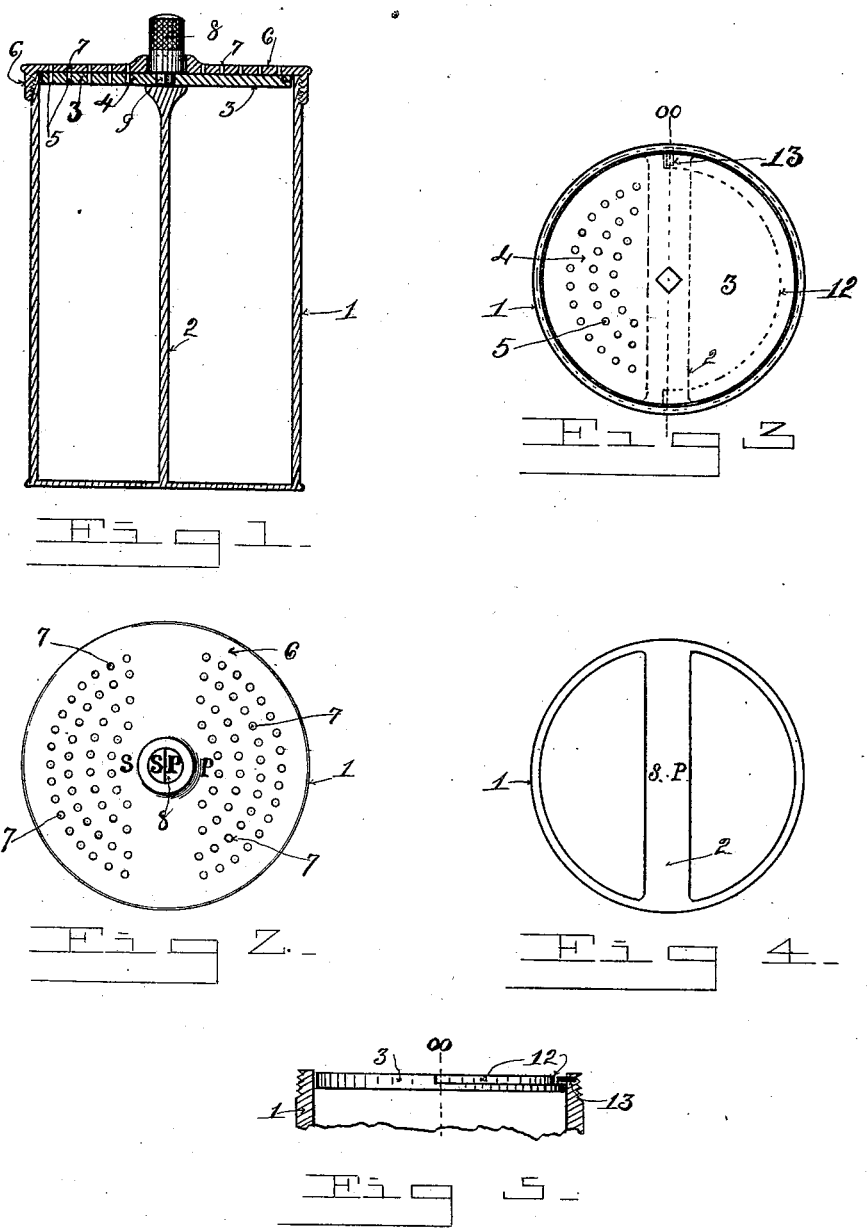
WITNESSES:
Claude A. Dunn
Bessie Thompson
INVENTOR.
Felix M. Lepore
BY H. P. Bailey
ATTORNEY.

United States Patent Office.

FELIX MARION LEPORE, OF DENVER, COLORADO.

SALT AND PEPPER HOLDER.

SPECIFICATION forming part of Letters Patent No. 646,846, dated April 3, 1900.

Application filed December 16, 1899. Serial No. 740,685. (No model.)

*To all whom it may concern:*

Be it known that I, FELIX MARION LEPORE, a citizen of the United States of America, residing at Denver, in the county of Arapahoe and State of Colorado, have invented certain new and useful Improvements in Salt and Pepper Holders; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a salt and pepper holder; and the objects of my invention are, first, to provide a combined salt and pepper holder, and, second, to provide a salt and pepper holder provided with a shiftable disk that can be moved to release the salt and cover the pepper or to release the pepper and cover the salt, as the user elects. I attain these objects by the mechanism illustrated in the accompanying drawings, in which—

Figure 1 is a central vertical section of my combined salt and pepper receptacle. Fig. 2 is a plan view of the receptacle. Fig. 3 is a plan view of the receptacle with the cover and finger-index removed. Fig. 4 is a plan view of the receptacle with the cover, the finger-index, and the hood removed. Fig. 5 is an edge view of the disk.

Similar figures of reference refer to similar parts throughout the several views.

Referring to the drawings, the numeral 1 designates the salt and pepper holder, which is represented as a cylinder and may be constructed of metal or glass or of any other suitable material. A partition 2 is formed across the cylinder, dividing it into two parts. One part is used for salt and the other for pepper. The top of the partition extends to within a short distance of the top of the cylinder, and a disk 3 sits upon it. The disk is perfectly flat and true on both sides, and the top of the partition should also be flat and smooth, so that the disk will bear tightly against it and prevent the salt and pepper from crossing the partition and from mingling with each other. Through one half 4 of the disk a number of perforations 5 are made, through which the salt or pepper passes. The opposite half of the disk is imperforate.

A cap 6 is threadedly secured to the top of the cylinder and arranged and adapted to fit close enough against the disk to prevent salt or pepper from working in between them to any harmful extent and at the same time allow the disk to rotate freely between the cap and the partition when the cap is screwed down tight on the top edge of the cylinder. The cap is perforated on opposite sides by numerous holes 7, which are preferably of the same size and number as those in the disk and are arranged to register over them where the disk is turned in the proper operative position.

A stem or pin or thumb-screw 8 is secured to the top of the disk, preferably by a square shank 9, although it may be secured in any other suitable way, as by soldering or screwing or by driving it into the disk. This stem extends loosely through the cap far enough to be firmly grasped by the fingers. Its upper portion is preferably knurled or fluted to offer a frictional resistance to the pressure of the fingers. In order to position the perforation in the cap and disk to register opposite one another operatively as the disk is partially rotated from one compartment to the other, it is necessary that a stop be provided that will define its movements in both directions, and also that an index be provided by which a user can determine the position of the salt and pepper. I preferably carry out these features of my invention by cutting a rabbet or step 12 in one-half of the circumference of the periphery of the disk and secure a pin 13 in the shell of the cylinder at the diametrical center of the cylinder and partition and arrange it to project loosely into the step in the disk. The rabbet or step should be enough longer than one-half of the circumference of the disk, which is designated by the dotted lines O O in Figs. 5 and 3, to allow for the diameter or thickness of the pin, so that the disk will make a complete half of a revolution when it is turned and the opposite end of or shoulder of the step contacts with the pin. I then place the letter "S" on one side of the finger-stem and the letter "P" on the opposite side when the disk is registering over one or the other compartment and is at one end of its movement, arranging them opposite the center of each compartment and placing corresponding letters opposite each letter on the stem on top of the cap. Then on the same sides of the top of the partition I stamp the same letters, so that the side marked "S" can be filled with salt and the side marked "P" can be filled with pepper. The letters on the outside of the cap will register rightly the contents in the compartment below. It is only necessary for the user to turn the stem with the fingers a half-revolution until it strikes the pin that defines its circular movement in order to bring the holes in the disk in line with those in the cap and to move the stem to bring the two letters "S S" opposite each other when the salt is desired and the letters "P P" opposite when pepper is desired.

My invention is simple and is easily taken apart, as the cap screws off the cylinder and stem, which remains fixed to the disk, and all parts can be quickly removed and replaced.

Having described my invention, what I claim as new, and desire to secure by Letters Patent, is—

1. In a combined salt and pepper holder, the combination of the cylinder having a partition arranged to divide it into two compartments, the disk mounted on the said partition and the finger-pin with the cap threaded to said cylinder and having indicating-letters in two of its opposite sides and arranged over said compartments, corresponding indicating-letters arranged to indicate the compartments under said indicating-letters on said cap and corresponding indicating reference-letters opposite to and on said finger-pin, substantially as described.

2. In a combined salt and pepper holder the combination of the cylinder, a cap threaded thereto, having perforations through two opposite sides, with the disk and the finger-pin arranged to be rotated a half of a revolution and having perforations through one of its sides and means including a stop-abutment for stopping the disk at each end of its semicircular movement to bring said perforations in said disk in alinement with those in said cap and a suitable indicator on said cap and finger-pin adapted to determine the location of the salt and pepper in said cylinder, substantially as described.

3. In a combined salt and pepper holder, the combination with the cylinder having a partition and compartments on each side of said partition and the cap, with the disk, a semicircular rabbet or step in said disk terminating in a shoulder at each end, a pin projecting from said cylinder into said step, a finger-pin secured to said disk and cap, perforations through two opposite sides of said cap over said compartments and on opposite sides of said partition, perforations through one side of said disk and corresponding indicating-letters on said cap and indicating-pin and in said cylinder, substantially as described.

In testimony whereof I affix my signature in presence of two witnesses.

FELIX MARION LEPORE.

Witnesses:
CLAUDE A. DUNN,
BESSIE THOMPSON.